May 12, 1970 R. E. HICKMAN 3,511,251
AUTOMATIC CAR WASH
Filed May 13, 1968 2 Sheets-Sheet 1
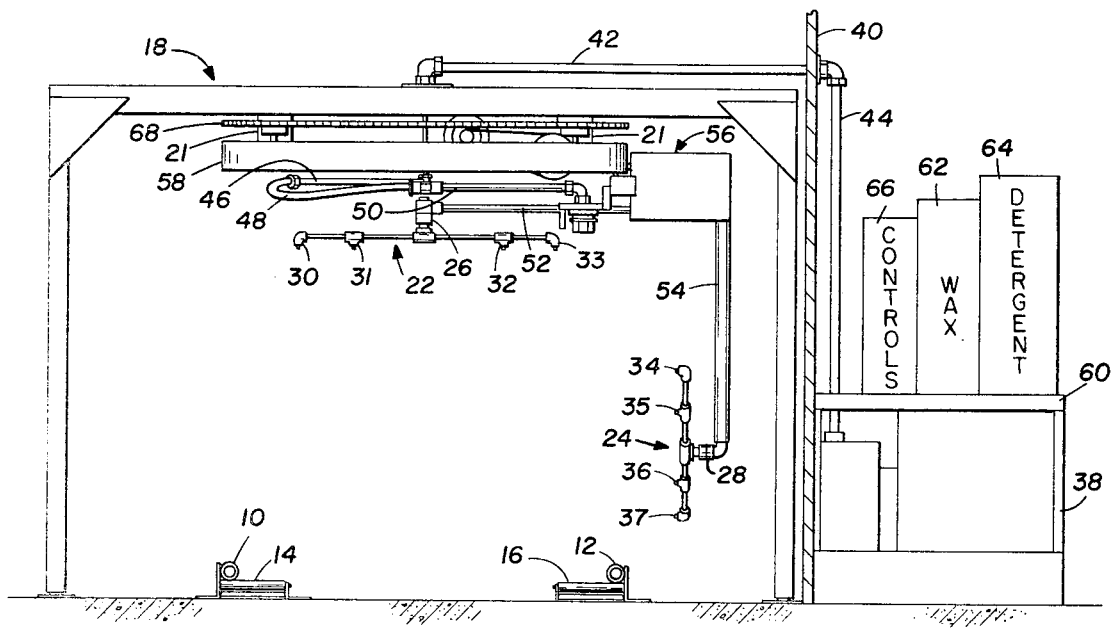
FIG. 1
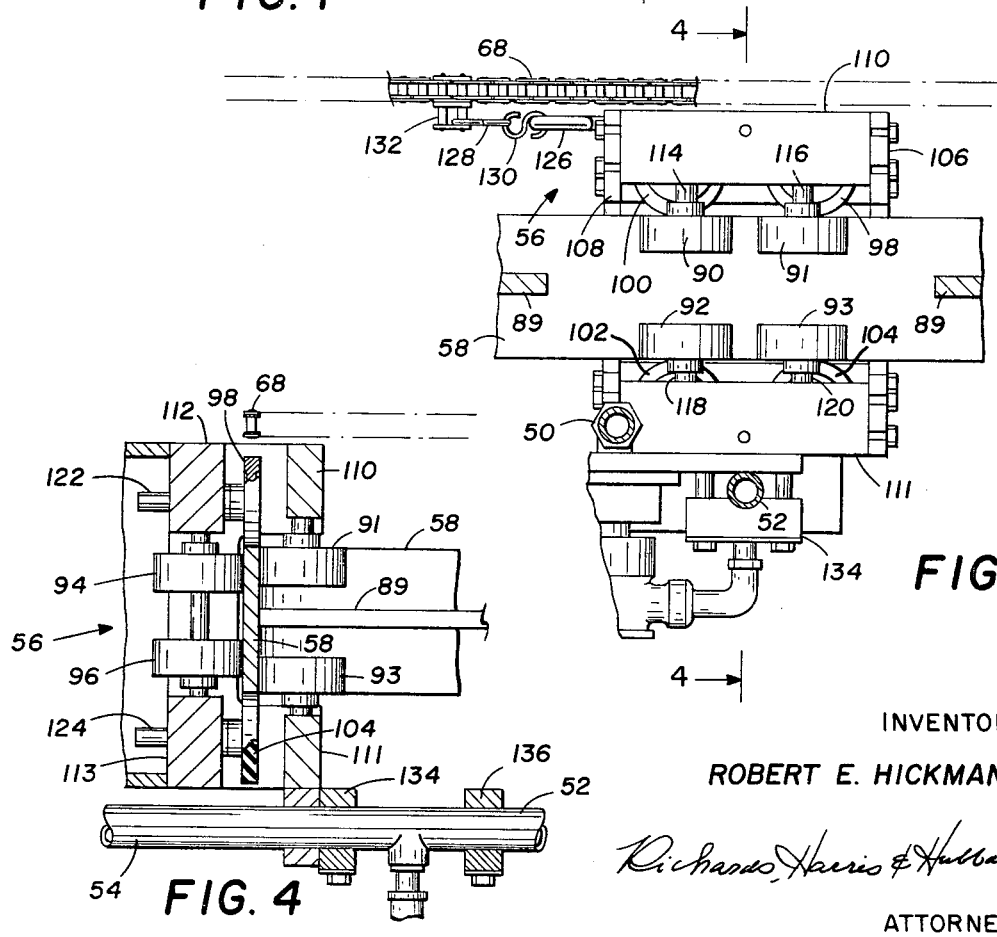
FIG. 3
FIG. 4
INVENTOR
ROBERT E. HICKMAN
Richards, Harris & Hubbard
ATTORNEYS 3,511,251
       AUTOMATIC CAR WASH
Robert E. Hickman, Dallas, Tex., assignor to Zenith
  Equipment Manufacturing Co., Dallas, Tex., a
  corporation of Delaware
       Filed May 13, 1968, Ser. No. 728,544
         Int. Cl. B60s 3/04; B08b 3/02
U.S. Cl. 134—123                           6 Claims

ABSTRACT OF THE DISCLOSURE

An apparatus for automatically washing a stationary vehicle having a horizontal and a vertical rotating sprinkler moving around the vehicle on a continuous track. A trolley including horizontally and vertically placed rollers riding on and against the continuous track supports the rotating sprinklers as they move around the parked vehicle. Power for driving the trolley around the continuous track is provided by means of an electric motor operated speed reducer with a drive sprocket coupled to the slow speed shaft. Three other sprockets are mounted in a spaced relationship around the continuous track and support a chain connected to the trolley. Rotating the drive sprocket causes the chain to propel the trolley around the track.

BACKGROUND OF THE INVENTION

This invention relates to an automobile washing system, and more particularly, to a stationary vehicle washing system wherein rotating sprinklers are driven around a continuous track by means of a moving chain coupled to a trolley.

Automatic sit-through washing stations are fast becoming the most popular method of maintaining the exterior finish of an automobile. In such systems, the driver remains in his car while the washing equipment, in a carousel action, completely cleans the car exterior by means of cleaning and rinsing sprays subsequently applied.

Heretofore, car washing stations usually consisted of a series of washing and drying stations through which a vehicle was either driven or towed by means of a moving chain. Such systems are not in the true sense completely automatic in that some wiping and drying is required to satisfactorily clean the automobile exterior. Because of the hand labor required, the cost of cleaning an automobile with such system is relatively high. In addition, because of the large, complicated pieces of equipment required, frequent breakdowns and delays often necessitated long waiting periods.

The automatic coin operated sit-through car wash provides the automobile owner with a relatively inexpensive method of maintaining the exterior finish of his car. These systems are automatic in the true sense of the word in that they do not require an attendant to perform any of the cleaning functions. The driver inserts the required number of coins in a coin slot and drives his auto into a washing bay. When he has driven over a sensing device, a timer control is actuated to commence a cleaning spray cycle. The cleaning spray cycle dispenses high pressure streams of water and a detergent over the entire exterior of the auto by means of rotating sprinklers. These sprinklers move around the parked vehicle a predetermined number of times. After the cleaning spray cycle has been completed, a rinsing spray cycle commences to dispense high pressure streams of clear water over the car to remove loosened dirt and detergent. The rinsing cycle spray also continues for a predetermined number of revolutions about the parked car. The exterior of the car is now clean and the driver proceeds from the washing station, thereby permitting another vehicle to be pulled into place.

Presently, there are two basic designs for the sit-through car wash systems. One includes a floor mounted track on which a small dolley travels as it rotates around a parked vehicle to dispense the cleaning and rinsing spray. The second basic system consists of an overhead track supporting a trolley which in turn supports the rotating sprinklers as they move around the stationary vehicle. Because of its relative remoteness from the movement of automobiles into and out of the cleaning station, the overhead track systems have found the greatest acceptance.

Although the overhead track system is mechanically relatively trouble-free, some problems have been encountered in the mechanisms employed to drive the trolley around the overhead track. Heretofore, the trolleys included complicated and sophisticated power sources for imparting motion to the trolley. These power sources moved with the trolley which resulted in a large and cumbersome device. Also, since the power source was usually electrically operated, electrical commutation with its inherent disadvantages was a necessity.

In accordance with the present invention, there is provided a sit-through car wash system employing an overhead continuous track for defining a path around which rotating sprinklers move during a cleaning and rinsing cycle. A trolley having horizontal and vertical rollers supports the rotating sprinklers on the continuous track. This trolley is driven by means of a chain rotating in a path having an outline generally resembling that of the continuous track. An electric motor affixed to the overhead track in a stationary position supplies motion to the chain thereby propelling the rotating sprinklers around a parked vehicle.

To simplify the job of maintaining the exterior finish of an automobile, it is an object of this invention to provide a sit-through car wash system having an improved trolley for supporting rotating sprinklers. Another object of this invention is to provide a sit-through car wash system wherein a stationary power source drives a trolley supporting rotating sprinklers. Still another object of this invention is to provide an automatic sit-through car wash system wherein a chain coupled to a trolley transfers power from a stationary source to the trolley. Other objects and advantages of this invention will be apparent from the specification and claims and from the accompanying drawings illustrative of the invention.

BRIEF DESCRIPTION OF THE DRAWINGS

FIG. 1 is a front view of a car washing bay in accordance with this invention with the necessary pumps and control systems connected thereto, FIG. 3 is an enlarged view of the track of FIG. 2 in the area of the sprinkler supporting trolley, and FIG. 4 is a cross-section of the trolley of FIG. 3 taken along the line 4—4.

DESCRIPTION OF A PREFERRED EMBODIMENT

Figure 2:
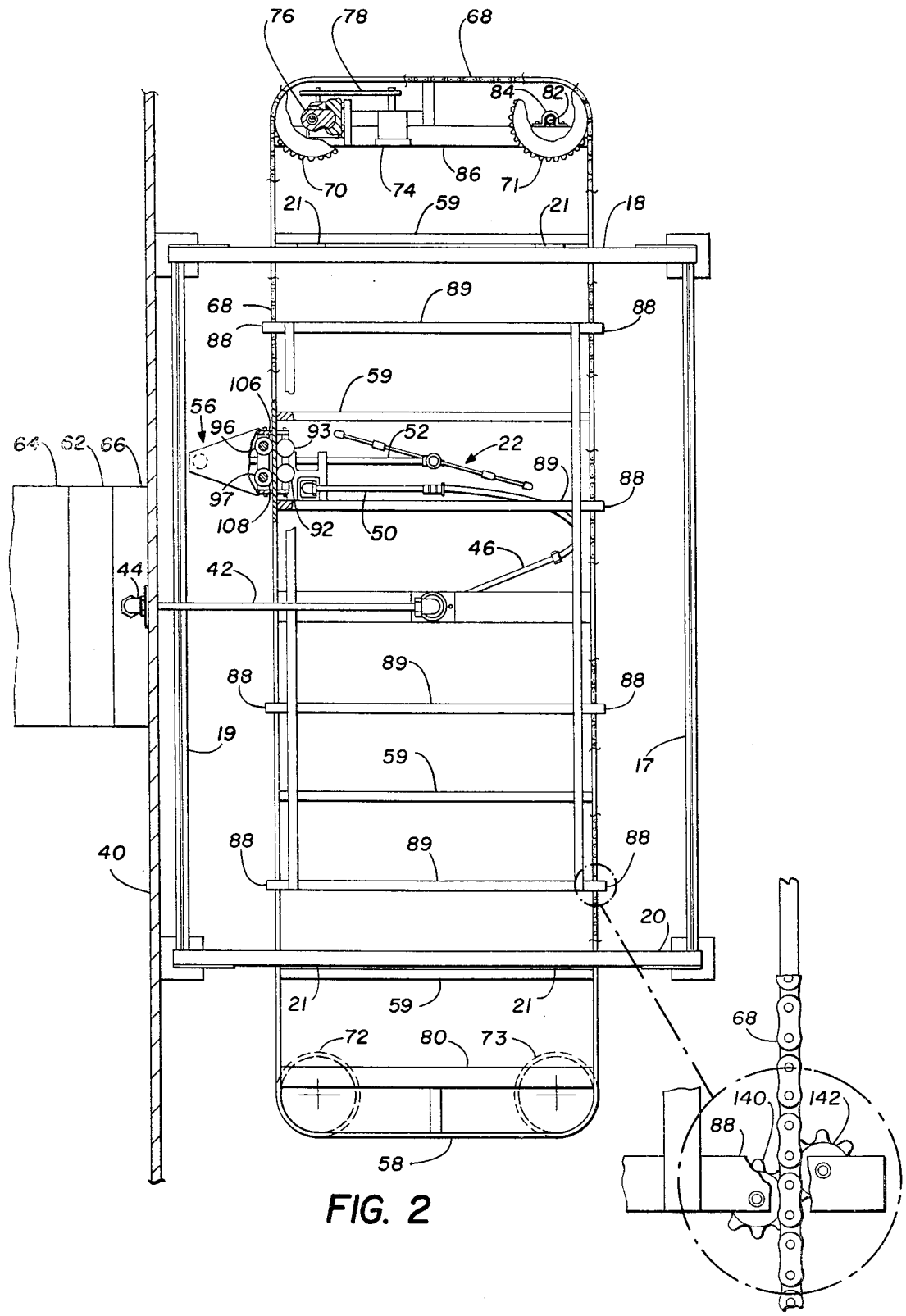
FIG. 2 is a plan view of a continuous track illustrating a stationary power source and a continuous chain for propelling a trolley supporting an arrangement of rotating sprinklers.

Referring now to the drawings, there is shown in FIGS. 1 and 2 a sit-through car washing station including guide tracks 10 and 12 and sensing stations 14 and 16 for properly locating a vehicle with respect to the washing mechanism. The washing mechanism itself is supported above the parked vehicle by means of longitudinal braces 17 and 19, and cross frames 18 and 20 having a height sufficient to permit driving an automobile into the washing bay without interference from a horizontal rotating sprinkler 22.

In addition to the horizontal rotating sprinkler 22 which washes the upper surfaces of a parked vehicle, there is also a side washing vertically oriented rotating sprinkler 24. The rotating sprinklers 22 and 24 are supported by rotating couplers 26 and 28, respectively, in the usual manner. Nozzles 30 through 33 of the rotating sprinkler 22 and nozzles 34 through 37 of the rotating sprinkler 24 are canted at an angle such that high pressure water discharged from the nozzles imparts a rotating motion to the sprinklers.

As explained previously, a normal cleaning cycle includes a cleaning step where high pressure streams of a water-detergent mixture are discharged by the rotating sprinklers 22 and 24 against the exterior of a parked vehicle. Subsequent to the cleaning step, high pressure streams of clear water are dispensed from the rotating sprinklers 22 and 24 to rinse away the water-detergent mixture and the dirt loosened thereby. The water-detergent mixture and the clear rinse water are supplied to the rotating sprinklers 22 and 24 from a high pressure pump 38 located adjacent the washing bay, usually separated by a wall 40. This high pressure pump 38 supplies pressurized fluids to the rotating sprinklers 22 and 24 by means of a piping arrangement consisting of pipes 42 and 44 and a swivel mounted pipe 46. A flexible hose 48 couples to the pipe 46 at one end and a pipe 50 on the other end. The pipe 50 feeds the high pressure liquids to the rotating sprinklers 22 and 24 by means of pipes 52 and 54, respectively.

Mounted above the pump 38 on a rack 60 are containers 62 and 64 and a control panel 66. The control panel 66 contains the necessary electronic timer circuitry to sequence the various cleaning and rinsing steps. Although not shown in the drawings, the electronic controls of the panel 66 are usually activated by means of one or more coins deposited in a coin slot. The containers 62 and 64 are filled with a liquid wax and detergent, respectively, for delivery by the pump 38 to the rotating sprinklers 22 and 24. When desired, usually for an additional cost, a water-wax mixture may be dispensed by the rotating sprinklers during one revolution around the parked vehicle during the rinsing step. Since the electrical controls and the piping arrangement for controlling the wax and detergent usage may take any one of many available variations, additional description will not be given.

To guide the rotating sprinklers 22 and 24 around the parked vehicle, a trolley 56 supports the sprinklers and associated piping on a continuous track 58. The track 58 is attached to the cross frames 18 and 20 by means of brackets 21 welded to the cross frames and to two of the channel irons 59. The track 58 forms a rectangle with rounded corners and has a length and width sufficient to assure that the rotating sprinkler 24 will pass around a vehicle being washed. Typically, the track 58 may be a strip of stainless steel ⅜" x 4" formed in a desired outline and welded to form a continuous track.

Driving power for the trolley 56 is provided by means of a continuous chain 68 supported on four sprockets 70 through 73. The sprockets 71 through 73 are mounted to rotate freely while the sprocket 70 is driven by means of an electric motor 74 coupled to a speed reducer 76 by means of a belt 78. A stiffener brace 80 contains mounting brackets (not shown) for supporting the sprockets 72 and 73 at respective corners of the track 58. The sprocket 71 rotates by means of a shaft 82 in a bearing block 84 that is bolted to a stiffener brace 86. Also attached to the brace 86 is the motor 74 and the speed reducer 76. An arrangement of eight idler sprocket pairs are provided at the tabs 88 at opposite ends of stiffener braces 89. The braces 89 are positioned above the track 58 such that the idler sprocket pairs maintain the chain 68 in the plane established by the sprockets 70 through 73. In addition, the idler pairs prevent the chain from "whipping" as it traverses the distance between the sprockets.

Referring to the insert in FIG. 2, there is shown an exploded view of one of the idler sprocket pairs including sprockets 140 and 142 mounted to the underside of the tab 88. The sprockets 140 and 142 are positioned on offset axis to allow the chain 68 to travel through the sprockets in a straight line.

Thus, the electric motor 74 drives the sprocket 70 to impart unidirectional motion to the chain 68 as it travels around the sprockets 70 through 73 and the idler sprocket pairs under the tab 88. By connecting the trolley 56 to this continuously moving chain, the unidirectional motion is also imparted thereto to move the rotating sprinklers 22 and 24 around a vehicle parked in the washing bay.

Referring now to FIGS. 3 and 4, there is shown in detail the trolley 56 and its coupling to the chain 68. An arrangement of eight horizontal rollers and four vertical rollers is provided to position the trolley 56 on the track 58. Four of the horizontal rollers 90 through 93 are located on the inside of the track 58 and four of the horizontal rollers, including rollers 94 and 96, are located on the outside of the track. The vertical rollers engage the upper and lower edge of the track 58; the upper vertical rollers 98 and 100 are made from hardened steel and the lower vertical rollers 102 and 104 from a hard rubber composition. Both the horizontal and vertical rollers are supported in a housing consisting of U-shaped side panels 106 and 108, and cross-members 110 through 113. The cross-member 110 supports the horizontal rollers 90 and 91 on shafts 114 and 116, respectively. Similarly, the cross-member 111 supports the rollers 92 and 93 on shafts 118 and 120, respectively. Note, the cross-members 110 and 111 are adjustably fastened to the side members 106 and 108 for proper alignment of the trolley 56 on the track 58. The cross-members 112 and 113 support the four outside horizontal rollers, such as rollers 94 and 96, as shown in FIG. 4. In addition, the cross-members 112 and 113 support the vertical rollers, such as rollers 98 and 104, on shafts 122 and 124, respectively.

An eye bolt 126 is threaded into the U-shaped side 108 of the trolley 56 as part of a transmission link to the chain 68. Two interconnected S-links 128 and 130 couple the eye bolt 126 to a double chain link 132 that forms a part of the chain 68. As the chain 68 travels around the sprockets 70-73, the motion thereof is imparted to the trolley 56 through the transmission link.

For the trolley 56 to follow the turns in the track 58 the outside horizontal rollers are spaced farther apart than the inside horizontal rollers. This condition is illustrated in FIG. 2 at the cut away portion of the track and trolley. Note, that the inner horizontal rollers 92 and 93 have a shorter center-to-center dimension than the outer horizontal rollers 96 and 97. The difference between the center-to-center dimension of the inner and outer rollers is determined by the radius of curvature of the continuous track 58.

Bolted to the underside of a trolley 56 by means of clamps 134 and 136 are the pipes 50 and 52 of the rotating sprinkler mechanism. Thus, the rotating sprinklers 22 and 24 move around the continuous track 58 along with the trolley 56 to which they are mounted. An important feature of this invention is that the trolley 56 does not include a self-contained power supply for driving around the track 58. This simplifies considerably the construction of the trolley 56 and in addition, enhances its reliability.

While only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. A car washing system having a cleaning and rinsing spray sequentially operated by means of a timer control comprising:

a pair of rotating sprinklers moving around a parked vehicle for dispensing the cleaning and rinsing sprays on said vehicle, a continuous track defining a substantially rectangular path for movement of the rotating sprinklers during the cleaning and rinsing spray operations around the stationary vehicle and including rotating sprockets at the corners thereof, a trolley for supporting said rotating sprinklers for movement thereof on said continuous track, a power source attached to said track and coupled to one of said sprockets for unidirectionally driving said trolley around the stationary vehicle, a drive chain movable in a path having the same general outline as said continuous track and engaging said sprockets for coupling power from said source to said trolley, and opposed idler sprockets rotatably mounted about said continuous track between the corner sprockets and engaging said drive chain to maintain said chain in a desired path during movement thereof, said chain being positioned to move between each of said sprocket pairs.

2. A car washing system as set forth in claim 1 wherein the idler sprocket pairs are positioned on offset axes to allow said chain to travel through in a straight line.

3. A car washing system as set forth in claim 1 including means for supporting said rotating sprinklers, said means including:

a frame having upper and lower cross members extending in the general direction of said continuous track, vertical rollers engaging the upper edge of said track mounted to one of said upper cross members, and four sets of horizontally opposed rollers engaging the sides of said track mounted in a spaced relationship to said cross members.

4. A car washing system as set forth in claim 3 wherein the horizontal rollers engaging the outside face of said continuous track are spaced farther apart than the rollers engaging the inside face of said track.

5. A car washing system as set forth in claim 4 including a pair of vertical rollers engaging the lower edge of said track mounted to the lower cross members.

6. A car washing system as set forth in claim 5 wherein said vertical rollers engaging the lower edge of said track are of a hard rubber composition.

References Cited

UNITED STATES PATENTS

| | | | |
|---|---|---|---|
| 927,994 | 7/1909 | Moore | 101—154 |
| 2,382,194 | 8/1945 | Wood. | |
| 2,738,321 | 3/1956 | Finston | 134—70 XR |
| 2,851,716 | 9/1958 | Becker et al. | 15—312 |
| 3,400,727 | 9/1968 | Daum et al. | 134—123 XR |
| 3,421,526 | 1/1969 | Alkire et al. | 134—123 XR |
| 3,443,993 | 5/1969 | Lynn et al. | 134—123 |

OTHER REFERENCES

Photograph taken at the Automatic Car Wash Association in St. Louis on July 27, 1967 (upper left photograph on page), copy in group 360, class 134, subclass 123.

DANIEL BLUM, Primary Examiner

U.S. Cl. X.R.

104—236; 105—154; 134—181